United States Patent [19]

Manian

[11] Patent Number: 4,838,632
[45] Date of Patent: Jun. 13, 1989

[54] TWO-DIMENSIONAL BEAM SCANNER

[75] Inventor: Bala S. Manian, Saratoga, Calif.

[73] Assignee: Lumisys Inc., Sunnyvale, Calif.

[21] Appl. No.: 191,004

[22] Filed: May 6, 1988

[51] Int. Cl.$^4$ ............................................. G02B 27/17
[52] U.S. Cl. ..................................... 350/6.91; 350/6.9
[58] Field of Search ......................... 350/6.9, 6.91, 6.5, 350/6.6, 6.7, 6.8, 285, 6.1–6.4; 346/160, 107 R, 108; 358/206, 208; 355/45, 51, 57, 60, 63, 43, 65, 66

[56] References Cited

U.S. PATENT DOCUMENTS

| 4,256,364 | 3/1981 | Minoura et al. | 250/6.91 |
| 4,375,063 | 2/1983 | Kitamura | 346/108 |
| 4,505,578 | 3/1985 | Balasubramanian | 355/43 |

FOREIGN PATENT DOCUMENTS 0108514  6/1983  Japan ................................. 350/6.91

OTHER PUBLICATIONS

Mecklenburg, A. C., "Two-Mirror, Two-Axis, Rapid Frame Rate Galvanometer Scanning Using a Novel Resonant Scanner/Dynamic Focusing Mechanism", SPIE, 1987.

Primary Examiner—Arthur G. Evans
Attorney, Agent, or Firm—Thomas Schneck

[57] ABSTRACT

A beam scanning system having a beam reflecting element, such as a mirror, disposed in the path of an incident beam defining an optical axis, which is pivotable about two perpendicular axes so as to provide for scanning a reflected beam in two dimensions. A pivot axis is perpendicular to the optical axis and may be provided by a spindle supporting a galvanometer mirror. The second axis coincides with the optical axis and may be provided by a meter driven shaft attached to the mirror support which is rotatable about the optical axis. The reflecting element reflects the beam toward an image plane that is parallel to the incident beam so as to scan a sequence of parallel lines without pincushion errors. An optical f-$\theta$ correcting lens may be provided in the reflected beam path to correct for tangential spacing errors in the image plane.

11 Claims, 2 Drawing Sheets

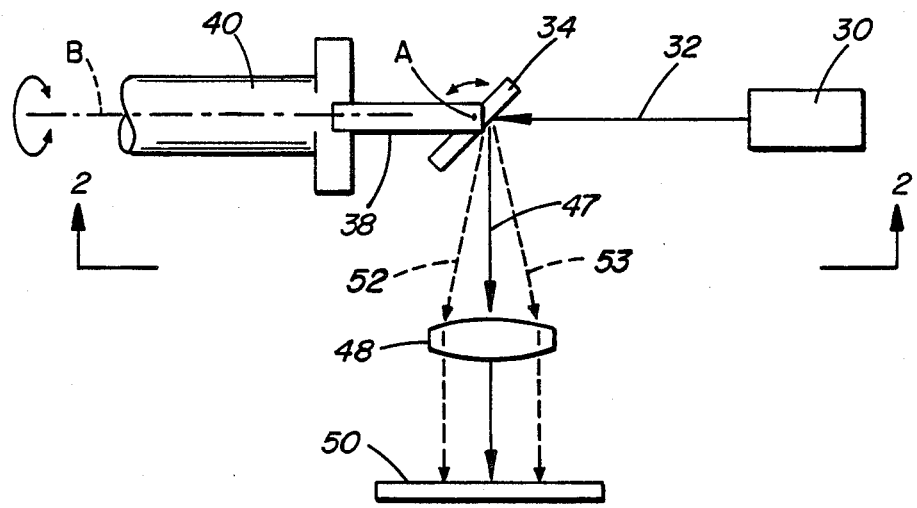
FIG._1.
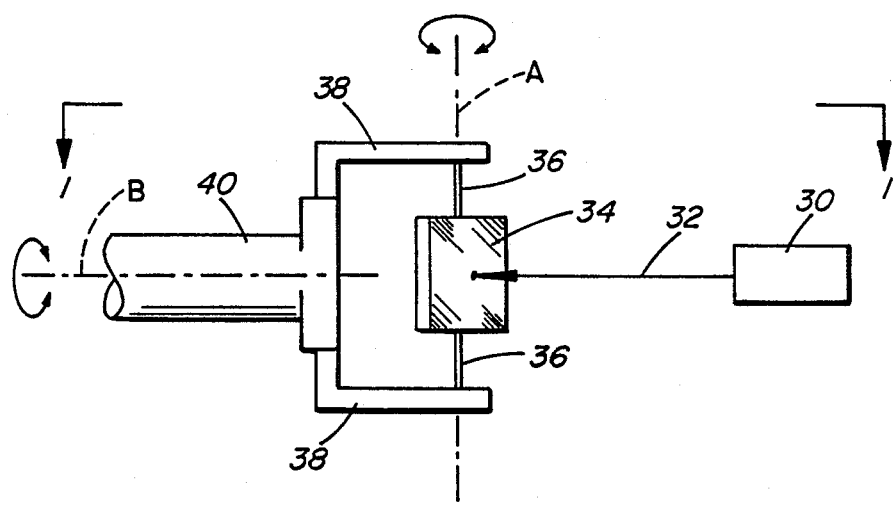
FIG._2.

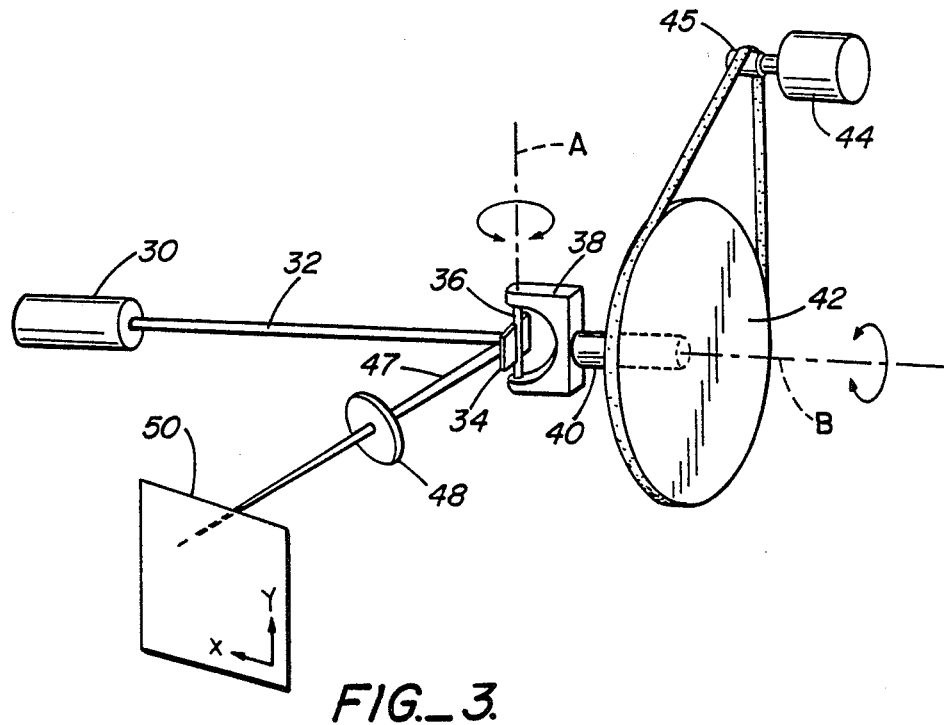
FIG._3.
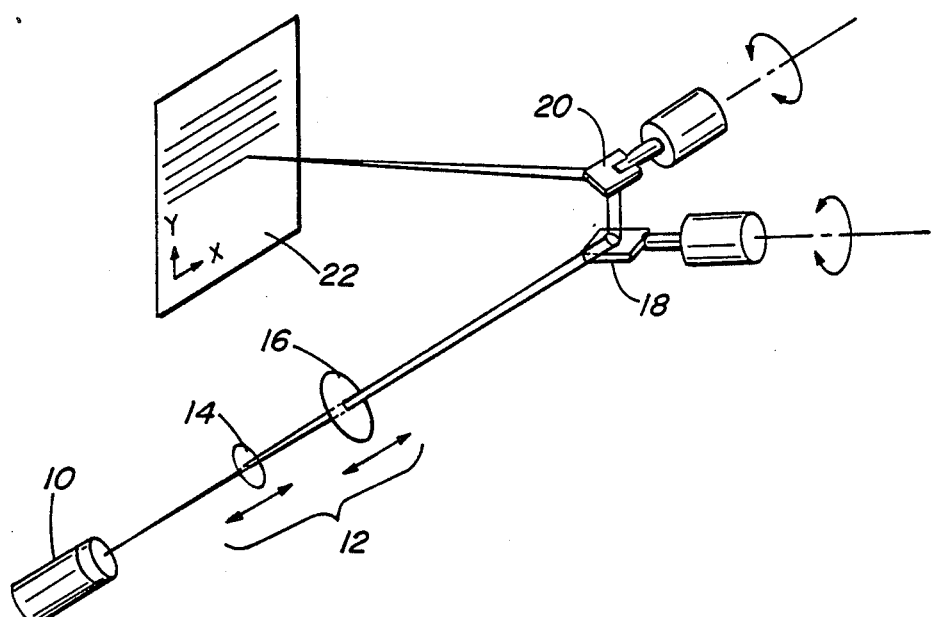
FIG._4. (PRIOR ART)

TWO-DIMENSIONAL BEAM SCANNER

TECHNICAL FIELD

The present invention relates to optical scanning systems including periodically moving reflective elements for light deflection, and in particular to two-dimensional scanning systems.

BACKGROUND ART

Beam scanners used for digital film recording are typically one of two types. A first type is a simple one-dimensional scanner, which is combined with means for moving film in a direction orthogonal to the scan direction, so as to record an image in a two-dimensional field on the film. Examples of this type of film recorder are given in U.S. Pat. No. 4,375,063 to Kitamura using a one-dimensional rotating polygon scanner and a rotating drum for moving the film, and U.S. Pat. No. 4,505,578 to Balasubramanian using an oscillating galvanometer mirror for one dimension of scanning and a braked gravity transport to move the film in the other direction at a uniform velocity.

The second type is a two-dimensional scanner having two scanning mirrors in series, each rotatable about an axis orthogonal with the other, so as to record an image in a two-dimensional field on stationary film. In A. C. Mecklenburg's article "Two-mirror, two-axis, rapid frame rate galvanometer scanning using a novel resonant scanner/dynamic focusing mechanism", *SPIE*, 1987, a scanning system is described which uses ROM lookup tables to correct distortions that would normally result from a two-mirror scanner. Referring to FIG. 4, the system includes a laser 10, a two-lens-combination beam expanding and focusing telescope 12 including a fast focus lens 14 and a slow focus lens 16, and two scanning mirrors, an X-mirror 18 that rapidly scans the laser beam across a Y-mirror 20, and the Y-mirror 20 which slowly sweeps the beam down the image plane 22. A pixel clock determines when spots are recorded.

Typically, two-mirror, two-dimensional scanners introduce a number of focus errors and distortions which must be compensated for. For example, if a spot in the center of the image is brought to a focus, the path of beam will be longer for spots away from the center and concentric rings of unfocus will result if the focus remains fixed. Mecklenburg includes a fast focus lens 14 moving in phase with the X scanning mirror 18 and a slow focus lens 16 stepping with the Y scanning mirror 20 to positions read from a ROM lookup table to keep the image spots in focus. Another error arises because the distance from the X scanning mirror 18 to the image plane changes as the beam is swept in a Y direction from top to bottom. Accordingly, when the angular amplitude of the X scanning mirror's motion is constant, the length of the line subtended by the image plane changes and lines at the top and bottom of the image are then longer than lines near the middle. This 'pincushion' error is corrected by Mecklenburg with a ROM lookup table which determines the X scanning mirror's angular amplitude on a line-by-line basis. Another error arises because the beam intersects the image plane at a point whose position relative to the center is proportional to the tangents of the mirror angles. Accordingly, equal angular steps of the Y scanning mirror 20 and equal angular intervals of the X scanning mirror 18 for recording the image do not correspond to equal distances in the image plane. An additional complication in spacing pixels may also occur when the X scanning mirror 18 oscillates sinusoidally instead of being driven linearly. These tangential and sinusoidal pixel spacing errors are compensated for by Mecklenburg by using ROM lookup tables to determine the Y scanning mirror's position for each line and to modify the frequency of a voltage controlled oscillator that determines the time interval between pixels.

An object of the present invention is to provide a two-dimensional beam scanner which has high positional accuracy and scan spot uniformity without needing computer compensation, which is simple in construction and which is capable of high scan rates.

DISCLOSURE OF THE INVENTION

The above object has been met with a beam scanning system having one beam reflecting element in the path of an incident beam which is pivotable about two perpendicular axes so as to provide for scanning of the reflected beam in two dimensions. A pivot axis is perpendicular to an optical axis defined by the incident beam, while a rotational axis is coincident with the optical axis. The beam reflecting element reflects the beam toward an image plane which is parallel to the incident beam.

Preferably, the reflecting element is a planar galvanometer mirror supported on a spindle for oscillating about the pivot axis. A stepper motor driven shaft attached to the mirror support turns the mirror and spindle assembly about the optical axis. Preferably, an f-θ lens is disposed in the path of the reflected beam to compensate for tangential spacing errors.

Advantages of this scanner geometry include the automatic elimination of the pincushion error noted by Mecklenburg's article. Because a single reflector is used, instead of two mirrors in series, the two axes are not displaced from one another and are therefore truly orthogonal and no pincushion distortion results. Further, the scanner is simple and highly compact. Two-dimensional scanning eliminates the need to control film motion, since the film in the image plane may remain stationary.

BRIEF DESCRIPTION OF THE DRAWINGS

FIG. 1 is a partial diagrammatic top plan view of a beam scanner of the present invention.

FIG. 2 is a partial diagrammatic side elevation view of the beam scanner of FIG. 1.

FIG. 3 is a schematic perspective view of the beam scanner of FIG. 1.

FIG. 4 is a schematic perspective view of a beam scanner of the prior art.

BEST MODE FOR CARRYING OUT THE INVENTION

With reference to FIGS. 1–3, a light source 30, not part of the scanner invention, produces a bright light beam 32, which is directed along an optical axis at a scanning mirror 34, part of the scanner of the present invention. Typically, scanning mirror 34 is a planar mirror, but this is not essential and concave focusing mirrors may also be used. Mirror 34 is supported on spindles 36 by a forked bracket 38. Mirror 34 is therefore pivotable about a pivot axis A. Mirror 34 may be moved by any means known in the art, but is typically a galvanometer mirror. Mirror 34 may rotate about pivot axis A at a known rate or may be sinusoidally oscillated.

Bracket 38 is attached to a shaft 40 coinciding with the optical axis B. Shaft 40 is, in turn, connected to a relatively large wheel 42, belt driven by a stepper motor 44 with a relatively small shaft 45. Motor 44 and wheel 42 with bracket and mirror assembly are supported on a base, not shown. Motor 44 drives wheel 42 about optical axis B so that mirror 34 is pivotable about axis B.

Incident beam 32 is reflected by mirror 34 and the reflected beam 47 may pass through an optional f-$\theta$ correcting lens 48 disposed in the path of reflected beam 47. Reflected beam 47 finally impinges on a film plate 50 lying in an image plane. f-$\theta$ lenses are known in the art and provide a beam displacement in the image plane which is proportional to the angular position of mirror 34. Typically, f-$\theta$ lenses are plural focal length lenses, with an aspheric surface and a focal length that varies in annular zones about the lens center so as to correct the beam displacement. Instead of a displacement which varies tangentially with the scan angle of mirror 34, the displacement varies linearly. Other potential beam paths for the reflected beam are indicated by dashed lines 52 and 53.

Pivot axis A is perpendicular to incident beam 32. Optical axis B coincides with incident beam 32. Image plane 50 is parallel to incident beam 32. These three relationships to incident beam 32 provide scans which are free from pincushion error. The addition of an f-$\theta$ lens disposed in the path of the reflected beam also eliminates tangential error in the scan. Applicant has discovered that no other combination of axes A and B will provide a distortion-free scan. In order to see how a distortion-free scan results, we consider that as mirror 34 pivots about pivot axis A, the reflected beam 47 sweeps a line lying in a first plane. Now rotating mirror 34 slightly about optical axis B, we find that pivot axis A has also been tilted slightly about optical axis B. The reflected beam 47 now sweeps a second plane which cuts the first plane through optical axis B. An entire scan therefore consists of a sequence of sweeps of reflected beam 47 in a number of planes radiating outward from optical axis B. Placing the image plane 50 parallel to incident beam 32 causes the image plane to cut the sequence of radiating planes so as to form a plurality of parallel lines in the image plane. Provided that the amplitude of mirror oscillation about pivot axis A is constant, each scan line will sweep the same length in the image plane. No compensation of mirror 34's oscillation amplitude is required because no pincushion error occurs. Further, the only compensation required to eliminate tangential error is the use of a f-$\theta$ lens 48. Sinusoidal errors introduced by sinusoidally oscillating mirror 34 may be compensated for by timing the recording of pixel spots on the film plate 50 as taught by Mecklenburg or may be compensated for by the addition of a second correction lens in the path of reflective beam 47. Alternatively, mirror 34 may be a linear galvanometer mirror or may rotate about pivot axis A at a constant rate.

In operation, mirror 34 oscillates about pivot axis A at a fast rate causing the reflected beam 47 to rapidly sweep across the film plate 50. Mirror 34 is then rotated slightly on shaft 40 about optical axis B so as to sweep a second line on film plate 50. Continuing in the same manner, stepper motor 44 rotates shaft 40 and therefore mirror 34 by equal angular steps, one step about optical axis B for each sweep of the beam across plate 50. Alternatively, mirror 34 may be rotated on shaft 40 about optical axis B to sweep a vertical line on plate 50 and incrementally turned about pivot axis A for each new scan line. Thus the scanner is capable of scanning in either of the horizontal or vertical direction, though scanning in the vertical direction is considerably slower.

A typical recording system utilizing the scanner of the present invention records an image with 4,096 by 5,080 micron pixels on a 14 inch by 17 inch format in less than 60 seconds. The scanner has a positional accuracy and repeatability of within one percent. The scanner also has better than one percent line spacing uniformity and scan spot size uniformity when f-$\theta$ lens 48 is used. As already noted, the scanner's axis relationships provide excellent geometric fidelity and low distortion.

I claim:

1. A beam scanning system comprising:
   a beam source for emitting an incident beam along an axis,
   means in the path of said incident beam axis for reflecting said incident beam,
   means supporting said reflecting means for pivoting said reflecting means about a pivot axis, said pivot axis being perpendicular to said incident beam axis, and
   means for pivoting said reflecting means about a rotational axis coinciding with the incident beam axis, the reflected beam intercepting an image plane parallel to the incident beam axis.

2. The beam scanning system of claim 1 wherein said reflecting means is a planar mirror.

3. The beam scanning system of claim 1 wherein said means for pivoting said reflecting means about said pivot axis comprises means for sinusoidally oscillating said reflecting means.

4. The beam scanning system of claim 1 wherein said means for pivoting said reflecting means about said pivot axis comprises means for rotating said reflecting means at a known rate.

5. The beam scanning system of claim 1 further defined by an f-$\theta$ lens disposed in the path of the reflected beam.

6. A beam scanning system comprising,
   a galvanometer mirror in the path of an incident beam, said beam defining an incident beam axis and being reflected by said mirror,
   means for pivotally supporting said galvanometer mirror about a pivot axis perpendicular to said incident beam axis, said mirror capable of turning about the pivot axis,
   a rotatable shaft connected to said supporting means, said shaft having an axis of rotation coinciding with said incident beam axis,
   means communicating with said shaft for turning said shaft in equal angular steps, and
   an f-$\theta$ correcting lens in the path of the reflected beam, the reflected beam being directed toward an image plane lying parallel to said incident beam axis.

7. The beam scanning system of claim 6 wherein said galvanometer mirror is a linearly scanning mirror.

8. The beam scanning system of claim 6 wherein said galvanometer mirror is a sinusoidally oscillating mirror.

9. The beam scanning system of claim 6 wherein said means for turning said shaft comprises
   a wheel connected to said shaft at a center of the wheel, a stepper motor for driving said wheel, and a belt connecting a shaft of said motor to an outside diameter of said wheel, said outer diameter being substantially larger than said shaft.

10. A method of scanning a beam comprising, directing an incident beam defining an incident beam axis onto a reflecting element, the incident beam being reflected thereby, pivoting said reflecting element about a pivot axis perpendicular to said incident beam axis so as to sweep said reflected beam in a line across an image plane, stepping said reflecting element by known angular amounts about the incident beam axis so as to cause said beam to sweep additional lines across said image plane, said image plane lying parallel to said incident beam axis.

11. The method of claim 10 further defined by correcting the path of said reflected beam with an f-θ lens.

* * * * *